(12) United States Patent
Collins et al.

(10) Patent No.: US 11,071,409 B2
(45) Date of Patent: Jul. 27, 2021

(54) HIGH-VOLTAGE BATTERY POWERED HEATING UNIT FOR VEHICLE AND HEATING UNIT POWERING METHOD

(71) Applicant: Ford Global Technologies, LLC, Dearborn, MI (US)

(72) Inventors: Patrick Gordon Collins, Canton, MI (US); Wendy L. Maclennan, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 16/149,196

(22) Filed: Oct. 2, 2018

(65) Prior Publication Data
US 2020/0100622 A1    Apr. 2, 2020

(51) Int. Cl.
*A47J 37/07* (2006.01)
*A47J 37/06* (2006.01)
(Continued)

(52) U.S. Cl.
CPC ....... *A47J 37/0709* (2013.01); *A47J 37/0623* (2013.01); *B60L 58/10* (2019.02);
(Continued)

(58) Field of Classification Search
CPC ............ A47J 2037/0777; A47J 37/0623; A47J 37/0709; B60L 58/10; B60P 3/32; B62D 33/0273; B65H 1/08; G03G 15/6502; G03G 2215/00383; H01M 10/613; H01M 10/625; H01M 10/655; H01M 10/6568; H01M 2220/20; B60K 1/04; B60K 6/28; B60K 2001/005; B60K 2001/003; B60K 2001/0405; B60K 2001/0416; B60K 2001/0438; B60K 2001/0444
(Continued)

(56) References Cited

U.S. PATENT DOCUMENTS 5,934,726 A    8/1999  Bossett
7,681,676 B2 *  3/2010  Kydd ...................... B60L 50/16
                                                    180/65.21
(Continued)

FOREIGN PATENT DOCUMENTS

CN          2105423       5/1992
CN        203047018       7/2013
(Continued)

OTHER PUBLICATIONS

Black Sheep Innovations, VW Amarok, Rival Unterfahrschutz, Delta 4x4, Schweiz, Heckklappen-Umbausatz / Tailgate modification set, retrieved from https://www.blacksheep-innovations.com/bilder-heckklappe on Aug. 23, 2018.

*Primary Examiner* — Dana Ross
*Assistant Examiner* — Joseph W Iskra
(74) *Attorney, Agent, or Firm* — David Kelley, Esq.; Carlson, Gaskey & Olds, P.C.

(57) ABSTRACT

A vehicle assembly includes, a traction battery and a heating unit. The heating unit is disposed within a cargo bed of a vehicle and selectively powered by the traction battery. A heating unit powering method includes powering a heating unit within a cargo bed of a vehicle using a traction battery of the vehicle.

14 Claims, 5 Drawing Sheets

(51) Int. Cl.
  *B60P 3/32* (2006.01)
  *H01M 10/655* (2014.01)
  *B62D 33/027* (2006.01)
  *B60L 58/10* (2019.01)

(52) U.S. Cl.
  CPC ............ *B60P 3/32* (2013.01); *B62D 33/0273* (2013.01); *H01M 10/655* (2015.04); *A47J 2037/0777* (2013.01); *H01M 2220/20* (2013.01)

(58) Field of Classification Search
  USPC ......................................................... 219/385
  See application file for complete search history.

(56) References Cited

U.S. PATENT DOCUMENTS

| | | | |
|---|---|---|---|
| 10,022,016 B1* | 7/2018 | Streett | A47J 37/0623 |
| 10,308,292 B1* | 6/2019 | Shedden | B60N 3/001 |
| 2009/0174212 A1* | 7/2009 | Donoho | B62D 33/03 |
| | | | 296/56 |
| 2013/0168176 A1* | 7/2013 | Takagi | B60K 6/48 |
| | | | 180/291 |

FOREIGN PATENT DOCUMENTS

| | | |
|---|---|---|
| CN | 105035541 | 6/2018 |
| KR | 2020090007020 | 7/2009 |

* cited by examiner

HIGH-VOLTAGE BATTERY POWERED HEATING UNIT FOR VEHICLE AND HEATING UNIT POWERING METHOD

TECHNICAL FIELD

This disclosure relates generally to a heating unit and, more particularly, to a heating unit that can be powered by a traction battery of a vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery selectively powers the electric machines and other electrical loads of the electrified vehicle. The traction battery can include battery arrays each including a plurality of interconnected battery cells that store energy. Some electrified vehicles, such as PHEVs, can charge the traction battery from an external power source. The traction battery is high-voltage battery when compared to, for example, a 12 Volt accessory battery.

SUMMARY

A vehicle assembly according to an exemplary aspect of the present disclosure includes, among other things, a traction battery and a heating unit. The heating unit is disposed within a cargo bed of a vehicle. The heating unit is selectively powered by the traction battery.

Another example of the foregoing vehicle assembly includes a cover movable between a closed position that covers the heating unit and an open position that exposes the heating unit.

In another example of any of the foregoing vehicle assemblies, the heating unit is disposed within a tailgate of the cargo bed.

In another example of any of the foregoing vehicle assemblies, the tailgate has a first cross-vehicle width and the cover has a second cross-vehicle width that is fifty percent or less of the first cross-vehicle width.

Another example of any of the foregoing vehicle assemblies includes an interconnect configured to transition between a locked position that holds the cover in the open position and an unlocked position that permits movement of the cover to the closed position in response to a thermal energy level.

Another example of any of the foregoing vehicle assemblies includes an inverter that converts direct current from the traction battery to alternating current for use by the heating unit.

In another example of any of the foregoing vehicle assemblies, the heating unit is an electric stove.

In another example of any of the foregoing vehicle assemblies, the traction battery selectively powers an electric drivetrain of the vehicle.

In another example of any of the foregoing vehicle assemblies, the traction battery is mounted to the vehicle and disposed outside of a tailgate of the cargo bed.

Another example of any of the foregoing vehicle assemblies includes a side shelf that is moveable between an extended position where the side shelf extends from a tailgate and a retracted position where the side shelf is retracted within the tailgate.

In another example of any of the foregoing vehicle assemblies, the side shelf covers the heating unit when in the retracted position and reveals the heating unit when in the extended position.

In another example of any of the foregoing vehicle assemblies, the vehicle is a plug-in hybrid vehicle configured to recharge the traction battery using a grid power source. The traction battery is configured to power the heating unit while recharging from the grid power source.

A heating unit powering method according to another exemplary aspect of the present disclosure includes, among other things, powering a heating unit within a cargo bed of a vehicle using a traction battery of the vehicle.

Another example of the foregoing powering method includes housing the heating unit within a tailgate of the vehicle.

Another example of any of the foregoing powering methods includes extending a side shelf from the tailgate to reveal the heating unit, and retracting the side shelf to cover the heating unit.

Another example of any of the foregoing powering methods includes moving a cover between a closed position that covers the heating unit and an open position that exposes the heating unit.

Another example of any of the foregoing powering methods includes locking the cover in the open position when a thermal energy level exceeds a threshold level.

In another example of any of the foregoing powering methods, the heating unit is an electric stove.

Another example of any of the foregoing powering methods includes charging the traction battery from a grid power source during the powering.

Another example of any of the foregoing powering methods includes, during the powering, converting direct current from the traction battery to alternating current for use by the heating unit.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a heating unit powered by a traction battery of a vehicle. The heating unit can be an electric stove disposed within a cargo bed of the vehicle, such as within a tailgate of the vehicle. The heating unit can enable a user to, for example, cook food at a cookout. The traction battery powering the heating unit provides a substantial power source enabling the heating unit to attain and maintain relatively high cooking temperatures.

Figure 1:
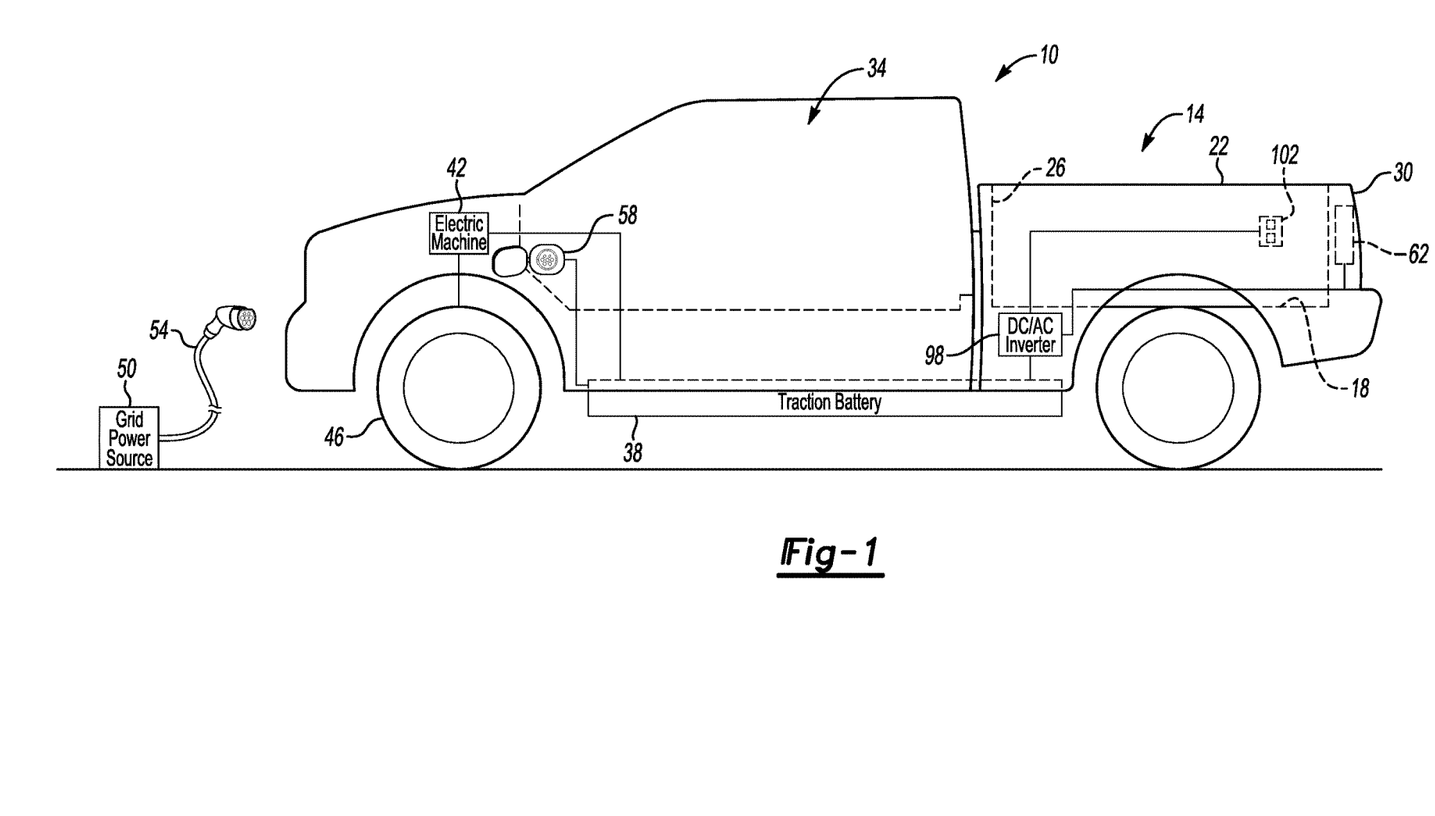
FIG. 1 illustrates a partially schematic side view of an electrified vehicle incorporating a heating unit within a cargo bed.

FIG. 1 schematically illustrates a vehicle 10 including a cargo bed 14. In the illustrated non-limiting embodiment, the vehicle 10 is a pickup truck. While a truck is pictured, vehicles other than trucks could also benefit from the teachings of this disclosure. The cargo bed could be within a vehicle having a liftgate or split-liftgates, for example.

Generally, the cargo bed 14 is provided by a floor 18, sidewalls 22, a front wall 26, and a tailgate 30. The cargo bed 14 establishes a cargo area for storing and hauling cargo with the vehicle 10. The example cargo bed 14 is rearward of a passenger cabin 34 of the vehicle.

In the example, vehicle 10 is an all-electric vehicle having an electric drivetrain that includes a traction battery 38, at least one electric machine 42, and a plurality of drive wheels 46. When powered, the electric machine 42 can drive the drive wheels 46 to move the vehicle 10. The electric machine 42 can receive electric power from the traction battery 38. The electric machine 42 converts the electric power to torque to drive the drive wheels 46.

The traction battery 38 is a traction battery since the traction battery 38 is used to provide motive power for the vehicle 10. The traction battery 38 is a relatively high-voltage battery. Generally, batteries over 50 to 60 Volts can be considered high-voltage. The traction battery 38 can be from 200 to 400 Volts in some examples. In other examples, the traction battery 38 could be as high as 800 Volts.

Although described as an all-electric vehicle, the vehicle 10 could be another type of electrified vehicle that includes a traction battery—a hybrid electric vehicle, for example. A hybrid electric vehicle can selectively drive wheels using torque provided by an internal combustion engine instead of, or in addition to, the electric machine powered by a traction battery.

The traction battery 38 of the vehicle 10 can be selectively recharged using a grid power source 50. To charge the traction battery 38 from the grid power source 50, a charger 54 is electrically coupled to the vehicle 10 through a charge port 58. Electrical energy can then move from the grid power source 50, through the charger 54, to the traction battery 38 of the vehicle 10. The electrical energy from the grid power source 50 recharges the traction battery 38. Due to the charge port 58 being engageable with the grid power source 50, the example vehicle 10 is considered a plug-in electrified vehicle.

Figure 2:
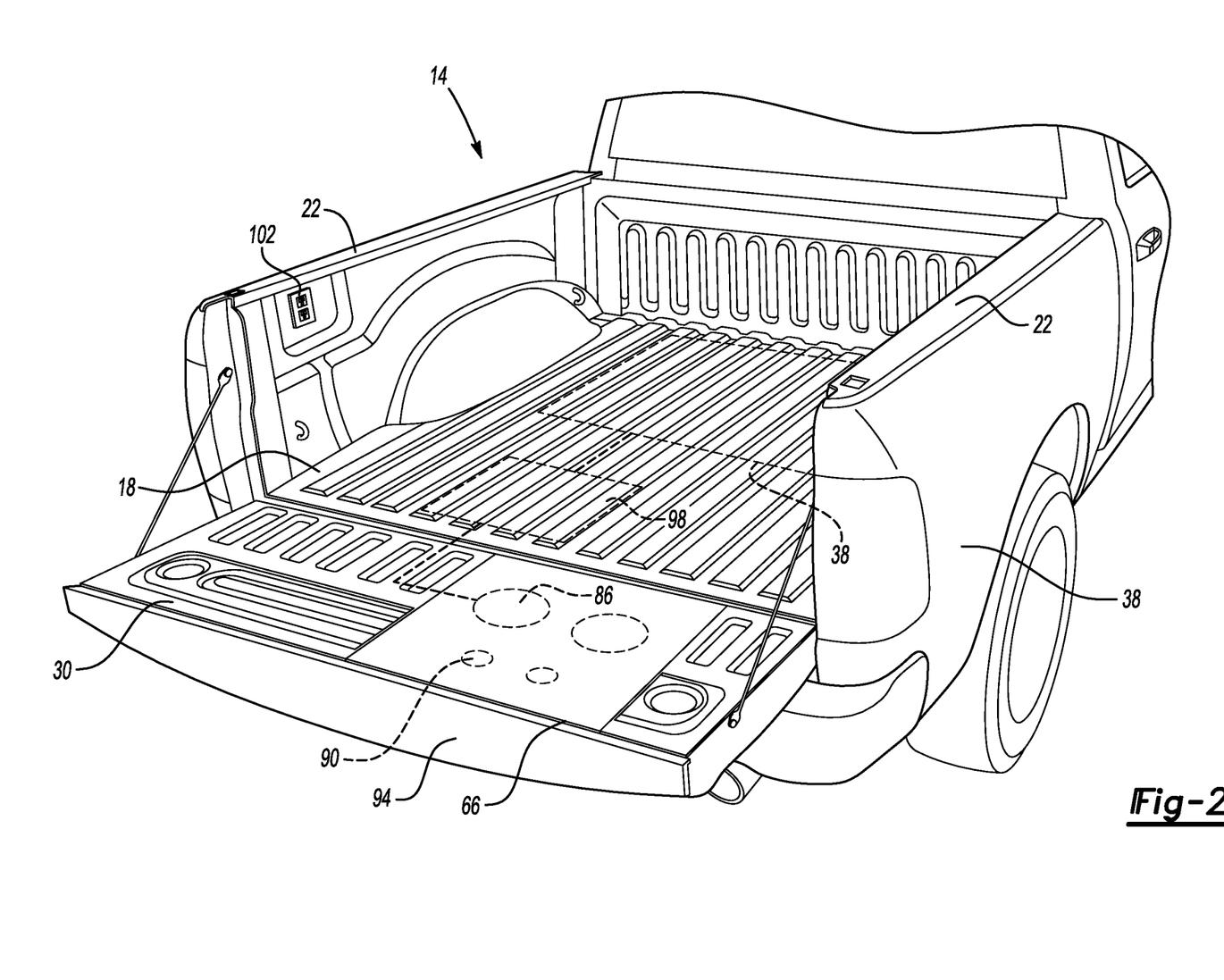
FIG. 2 illustrates a rear view of the vehicle of FIG. 1 with a tailgate of the cargo bed in a tailgate open position and a cover in a closed position where the cover covers the heating unit.
Figure 3:
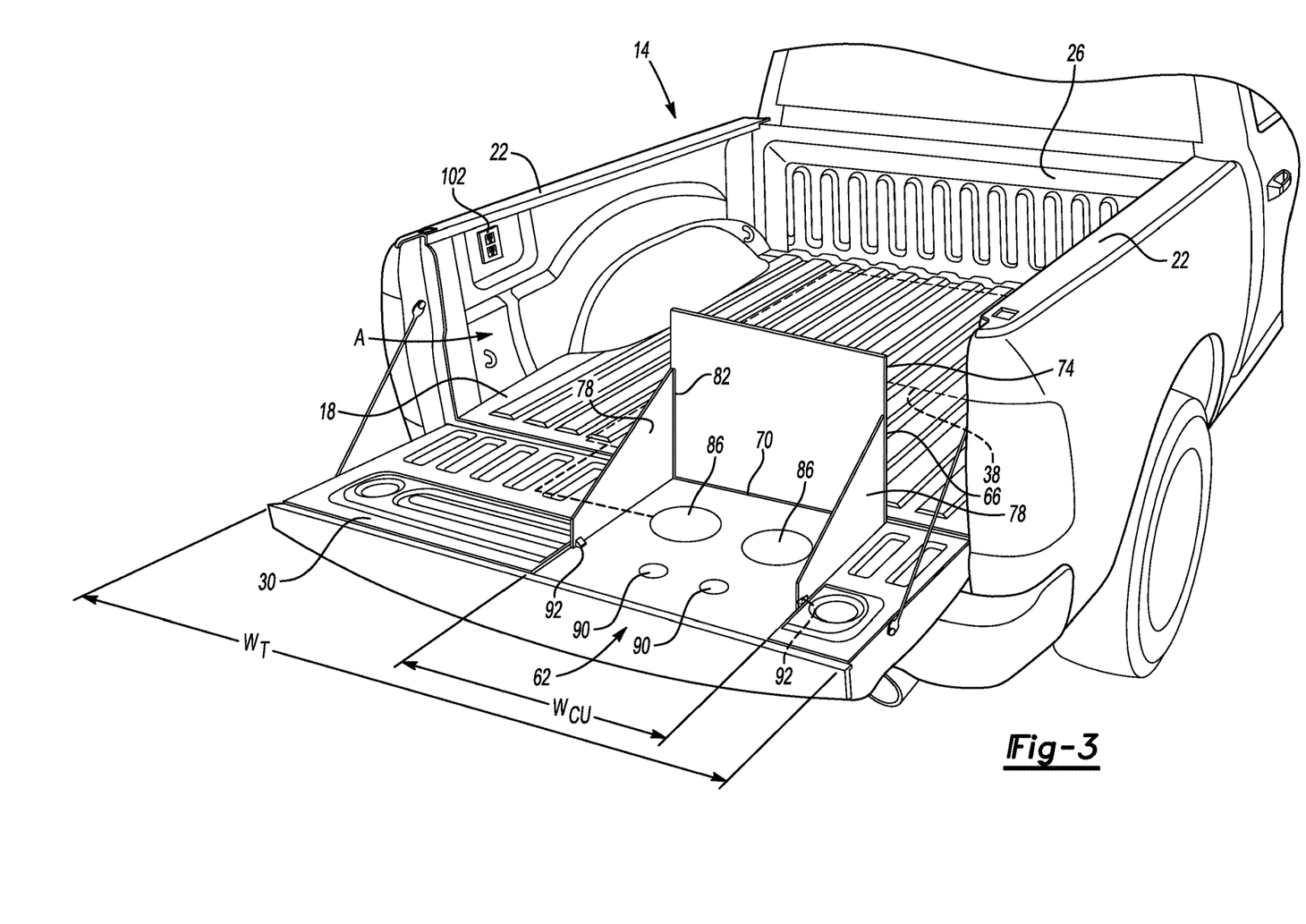
FIG. 3 illustrates the rear view of FIG. 2 with the cover in an open position revealing the heating unit.

With reference now to FIGS. 2 and 3 and continued reference to FIG. 1, a heating unit 62 is disposed within the cargo bed 14 of the vehicle 10. In particular, in this exemplary non-limiting embodiment, the heating unit 62 is disposed within the tailgate 30. The heating unit 62 moves with the tailgate 30 from the closed tailgate position of FIG. 1 to the open tailgate position of FIGS. 2 and 3. In another example, the heating unit 62 is disposed within the floor 18.

A cover 66 is moveable between a closed position shown in FIG. 2, where the cover 66 covers the heating unit 62, to an open position shown in FIG. 3, where the cover 66 reveals or exposes the heating unit 62.

To utilize the heating unit 62, a user moves the tailgate 30 from the closed tailgate position of FIG. 1 to the open tailgate position of FIG. 2, and then moves the cover 66 to the open position of FIG. 3 to expose the heating unit 62.

The cover 66 can hingeably connect to the tailgate 30 via a hinge 70. The cover 66 can include a back cover 74 and side covers 78. The side covers 78 may hingeably connect to the back cover along hinged connection points 82. The side covers 78 can and fold inward toward the back cover 74 to permit the back cover 74 to move from the open position of FIG. 3 back to the closed position of FIG. 2.

The heating unit 62, in this example, is an electric stove that includes a plurality of burners 86 and controls 90. At a tailgating event, for example, the user can warm food by placing a pan with food on one of the burners 86. The controls 90 can be used to turn on the burners 86 and to adjust thermal energy levels provided by the burners 86.

The controls 90 and the burners 86 are covered by the cover 66 when the cover 66 is in the closed position of FIG. 2. The cover 66 can protect the burners 86, the controls 90 and elements of the heating unit 62. The cover 66 may include a latch mechanism 94 that holds the cover 66 in the open position of FIG. 2. The latch mechanism 94 could be a push-down, pop-up type latch mechanism 94, for example. The latch mechanism 94 could be partially integrated with a latch system that holds the tailgate 30 in the tailgate open position, which could prevent the latch mechanism 94 from unlatching unless the tailgate 30 is in the tailgate open position.

The cover 66 is made of a durable and robust material that can withstand normal use of the tailgate 30 and surrounding cargo bed 14 area. The cover 66 can be made of the material similar to a truck bed liner material. The material of the cover 66 can be polymer-based, for example, and can be selected to withstand thermal energy generated by the burners 86 of the heating unit 62 when the cover 66 is in the open position.

In some examples, an interlock 92 can be incorporated into the heating unit 62, the cover 64, or both. The interlock 92 can prevent the user from moving the cover 66 to the closed position of the FIG. 2 when the heating unit 62 is too hot and could damage the cover 66.

For example, the interlock 92 can move between a locked position that locks the cover 66 in the open position of FIG. 3, and an unlocked position that permits movement of the cover 66 from the open position of FIG. 3 to the closed position of FIG. 2. The interlock 92 can move automatically from the locked position to the unlocked position in response to a temperature of the burners 86, for example, falling below a threshold value. The interlock 92 interfaces with the side cover 78 in this example, but could interface instead, or additionally, with the back cover 74. A temperature sensor in the tailgate 30 could provide temperature data to the interlock 92.

When the heating unit 62 is powered, or when the burners 86 have not sufficiently cooled after cutting power to the heating unit 62, the interlock 92 is automatically maintained in the locked position to prevent the user from closing the cover 66 on burners 86 that have not cooled. A person having skill in this art and the benefit of this disclosure could understand an interlock that transitions in response to a sensed thermal energy level.

The tailgate 30 has a cross-vehicle width represented by $W_T$. The heating unit 62 has a cross-vehicle width represented by $W_{CU}$. The cover 66 has a cross-vehicle width generally corresponding to the width $W_{CU}$ of the heating unit 62.

In this example, the width $W_{CU}$ of the heating unit 62 is fifty percent or less of the width $W_T$ of the tailgate 30. This can ensure that the user has access A to the cargo bed 14 even when the heating unit 62 is being used and the cover 66 is in the open position of FIG. 3. At a tailgate party, for example, individuals can enter and exit the cargo bed 14 through the area A even when the heating unit 62 is in use.

The exemplary heating unit is shown as the electric stove, other heating units could be used in other examples, such as a microwave, other inductive heating mechanisms, etc.

Notably, the heating unit 62 is powered by the traction battery 38 of the vehicle 10. The vehicle 10 can include a Direct Current (DC) to Alternating Current (AC) inverter 98 that converts DC from the traction battery 38 to AC for powering by the heating unit 62. The converted AC from the inverter 98 can additionally be used to power outlets 102 of the vehicle 10. An example of the outlets 102 is shown in the sidewall 22 of the vehicle 10. In another example, the heating unit 62 is DC powered directly from the traction battery 38 and the converting of DC to AC for the heating unit 62 is omitted.

Due to the high-voltage of the traction battery 38, the traction battery 38 can provide relatively high amounts of electrical energy to the heating unit 62, which can generate substantial amounts of thermal energy used for cooking for extended periods of time.

In some examples, if a charge level of the traction battery 38 drops below a threshold level, the vehicle 10 can draw power from the grid power source 50 through the charger 54 that recharges the traction battery 38. The recharging of the traction battery 38 can occur as the traction battery 38 is powering the heating unit 62. This provides the heating unit 62 with, effectively, an unlimited supply of electrical energy.

Figure 4:
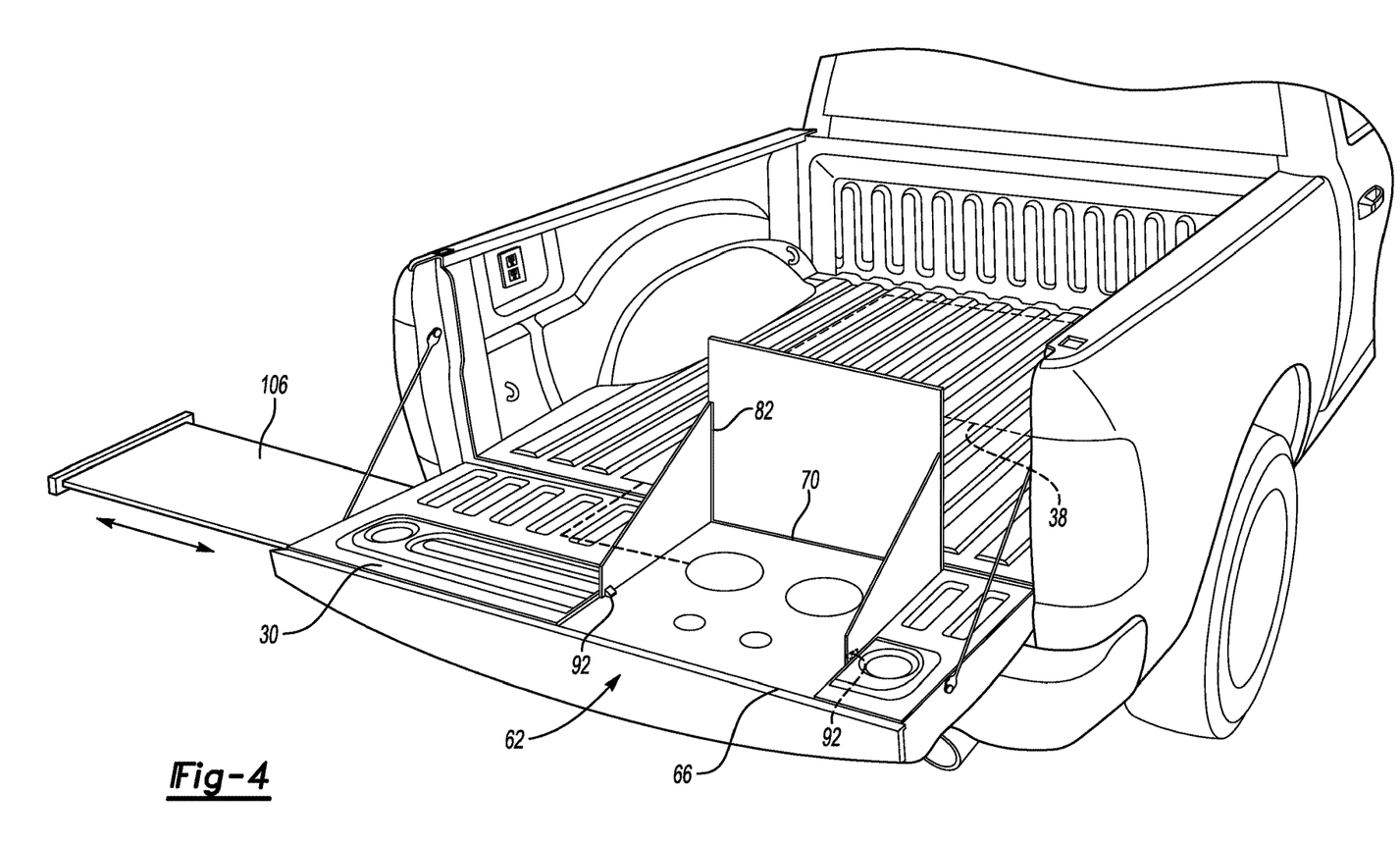
FIG. 4 illustrates a vehicle according to another exemplary embodiment that incorporates a side shelf along with a heating unit within a cargo bed.

With reference now to FIG. 4, the heating unit 62 and cover 66 are similar in design to the embodiment of FIGS. 1-3. The tailgate 30 incorporates the additional feature, however, of a side shelf 106 that is moveable between the extended position shown in FIG. 4 and a retracted position where the side shelf 106 is received within the tailgate 30.

The side shelf 106 can provide the user with an additional work surface when utilizing the heating unit 62. The side shelf 106 can be a cutting board material to provide a surface suitable for food preparation, or could be another type of material. The side shelf 106 can be cantilever supported thereby eliminating the need for any external support post extending downward from the side shelf 106.

Figure 5:
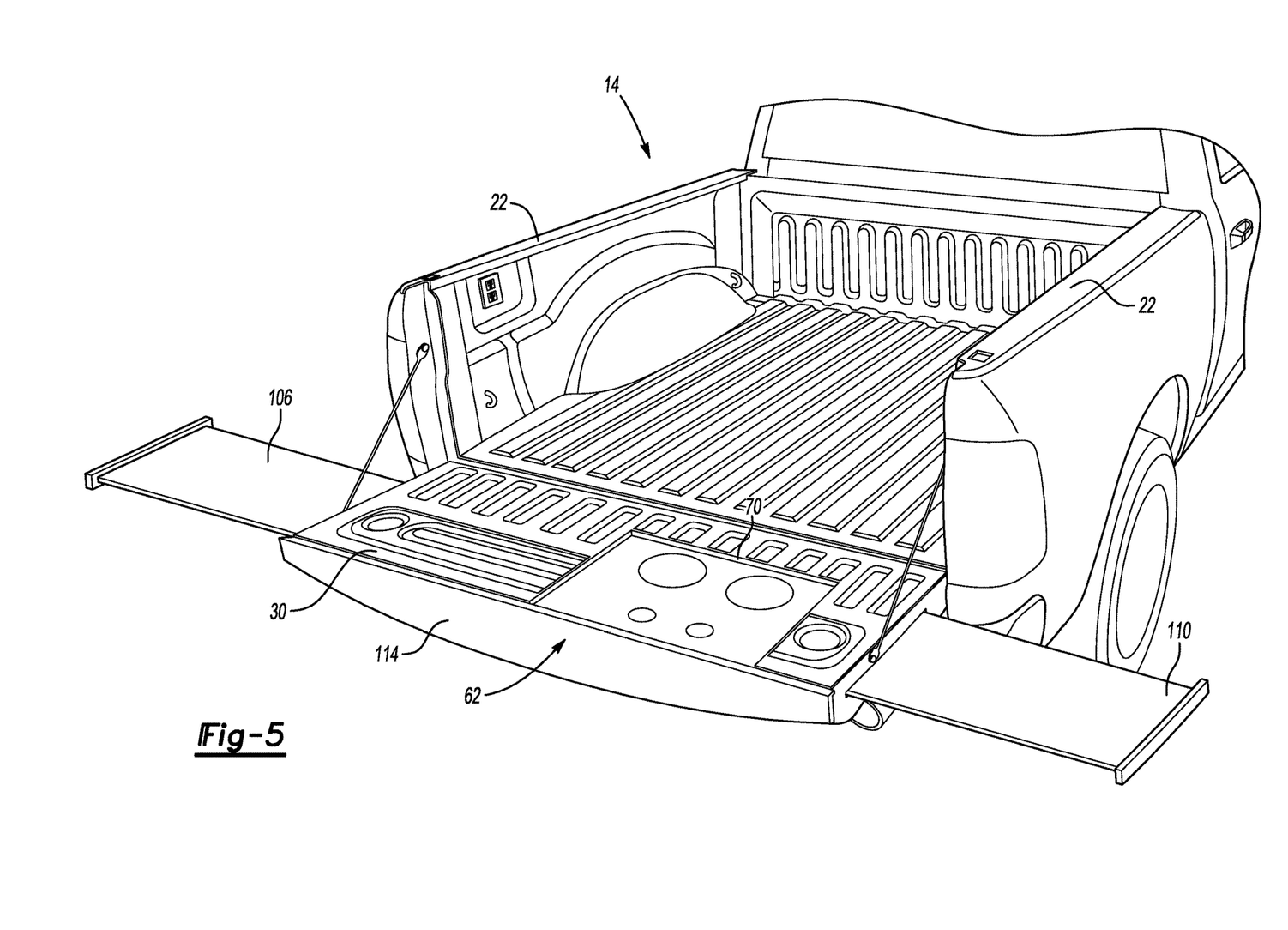
FIG. 5 illustrates a vehicle according to yet another exemplary embodiment that incorporates a side shelf that provides a cover for a heating unit when the side shelf is in a retracted position.

In the exemplary non-limiting embodiment of FIG. 5, the heating unit 62 is again similar in design to the embodiment of FIGS. 1-3. The cover 66, however, is omitted. The tailgate 30 includes the side shelf 106 that is extendable from a driver side of the tailgate 30, and also includes a side shelf 110 that extends and retracts from a passenger side of the tailgate 30.

In this exemplary embodiment, the side shelf 110 provides a work surface in addition to the side shelf 106. The side shelf 110 also acts as a cover for the heating unit 62 when the side shelf 110 is in a retracted position. Incorporating the side shelf 110 can eliminate the need for the cover 66.

When the side shelf 110 is in the extended position of FIG. 5, the side shelf 110 reveals the heating unit 62 for use. When the side shelf 110 is retracted within the tailgate 30, the side shelf 110 covers the heating unit 62 and provides protection to the heating unit 62 similar to the protection provided by the cover 66 described in connection with the embodiment of FIGS. 1-3.

The heating unit 62 can be slightly recessed relative to a vertically uppermost surface of the tailgate 30 when in the open position of FIG. 5. Recessing the heating unit 62 enables the side shelf 110 to move over the heating unit 62 when in the retracted position within the tailgate 30.

The side shelves 106 and 110 can move between the extended and retracted positions via tracks or rails. The side shelves 106 and 110 may lock into the extended position or the retracted position with latch-type mechanisms. Additionally, when the tailgate 30 is moved to a closed position, the sidewalls 22 of the cargo bed 14 could hold the side shelves 106 and 110 in the retracted position.

Although the side shelves 106 and 110 are shown extending from opposing lateral sides of the tailgate 30, the side shelves could instead extend vertically rearward from a surface 114 of the tailgate 30. One or more of the side shelves extending from the surface 114 could provide a cover to the heating unit 62 when in the retracted position.

Features of the disclosed examples include a heating unit incorporated into a cargo bed of a vehicle. The heating unit is powered by a traction battery of the vehicle. Powering the heating unit with the traction battery can provide a more stable and powerful source of electrical energy than heating units that receiving electrical energy from other, lower power, power supplies.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a traction battery; and
   a heating unit disposed within a cargo bed of a vehicle and selectively powered by the traction battery; and
   a side shelf that is moveable between an extended position where the side shelf extends from a tailgate and a retracted position where the side shelf is retracted within the tailgate, wherein the side shelf covers the heating unit when in the retracted position and reveals the heating unit when in the extended position.

2. The vehicle assembly of claim 1, further comprising a cover movable between a closed position that covers the heating unit and an open position that exposes the heating unit.

3. The vehicle assembly of claim 2, wherein the heating unit is disposed within a tailgate of the cargo bed.

4. The vehicle assembly of claim 3, wherein the tailgate has a first cross-vehicle width and the cover has a second cross-vehicle width that is fifty percent or less of the first cross-vehicle width.

5. The vehicle assembly of claim 2, further comprising an interlock configured to transition between a locked position that holds the cover in the open position and an unlocked position that permits movement of the cover to the closed position in response to a thermal energy level.

6. The vehicle assembly of claim 1, further comprising an inverter that converts direct current from the traction battery to alternating current for use by the heating unit.

7. The vehicle assembly of claim 1, wherein the heating unit is an electric stove.

8. The vehicle assembly of claim 1, wherein the traction battery selectively powers an electric drivetrain of the vehicle.

9. The vehicle assembly of claim 1, wherein the traction battery is mounted to the vehicle and disposed outside of a tailgate of the cargo bed.

10. The vehicle assembly of claim 1, wherein the vehicle is a plug-in hybrid vehicle configured to recharge the traction battery using a grid power source, wherein the traction battery is configured to power the heating unit while recharging from the grid power source.

11. A heating unit powering method, comprising:
 powering a heating unit within a cargo bed of a vehicle using a traction battery of the vehicle;
 housing the heating unit within a tailgate of the vehicle; and
 extending a side shelf laterally from the tailgate to reveal the heating unit, and retracting the side shelf to cover the heating unit.

12. The heating unit powering method of claim 11, wherein the heating unit is an electric stove.

13. The heating unit powering method of claim 11, further comprising charging the traction battery from a grid power source during the powering.

14. The heating unit powering method of claim 11, further comprising, during the powering, converting direct current from the traction battery to alternating current for use by the heating unit.

\* \* \* \* \*